US006699403B2

(12) United States Patent
Dluzneski et al.

(10) Patent No.: US 6,699,403 B2
(45) Date of Patent: Mar. 2, 2004

(54) SUPPORTED PEROXIDES

(75) Inventors: Peter R. Dluzneski, Newark, DE (US); Martin J. Gregor, Hudson, OH (US)

(73) Assignee: Geo Specialty Chemicals, Inc., Cleveland, OH (US)

( * ) Notice: Subject to any disclaimer, the term of this patent is extended or adjusted under 35 U.S.C. 154(b) by 55 days.

(21) Appl. No.: 10/104,472

(22) Filed: Mar. 22, 2002

(65) Prior Publication Data

US 2003/0178599 A1 Sep. 25, 2003

(51) Int. Cl.⁷ .............................................. C01B 15/10
(52) U.S. Cl. ............................ 252/186.26; 252/186.42; 252/186.2
(58) Field of Search ....................... 252/186.26, 186.42, 252/186.2; 510/309; 523/211, 440; 525/27

(56) References Cited

U.S. PATENT DOCUMENTS

| 4,321,301 A | * | 3/1982 | Brichard et al. ............ 428/403 |
| 4,350,681 A | * | 9/1982 | Fulton, Jr. ................... 424/53 |
| 4,455,252 A | * | 6/1984 | Wylegala et al. ...... 252/186.26 |
| 4,515,929 A | * | 5/1985 | Tang ........................... 526/228 |
| 4,560,495 A | * | 12/1985 | Kato ..................... 252/186.23 |
| 4,808,639 A | | 2/1989 | Chernack |
| 4,861,506 A | | 8/1989 | Chauvier et al. |
| 4,917,816 A | | 4/1990 | Self |
| 4,978,528 A | | 12/1990 | Degre |
| 5,110,495 A | | 5/1992 | Self |
| 5,238,978 A | * | 8/1993 | Stein ........................... 523/351 |
| 5,536,435 A | | 7/1996 | Chapman et al. |
| 6,086,785 A | | 7/2000 | Roesler et al. |
| 6,310,117 B1 | | 10/2001 | Sawada et al. |

* cited by examiner

Primary Examiner—Joseph D. Anthony
(74) Attorney, Agent, or Firm—Rankin, Hill, Porter & Clark LLP

(57) ABSTRACT

The present invention provides supported peroxides, and a method of forming supported peroxides. Supported peroxides according to the invention are solid particles that include an organic peroxide and a metallic soap. In accordance with the method of the invention, supported peroxides are preferably formed by dispersing a mixture that includes at least one peroxide and at least one $C_4$ to $C_{30}$ carboxylic acid into an aqueous solution that includes a compound that is capable of reacting with the $C_4$ to $C_{30}$ carboxylic acid to form a water soluble soap. Dispersing the mixture into the aqueous solution results in the formation of an emulsion. A polyvalent metal compound that is capable of reacting with the water soluble soap to form a water insoluble metallic soap is then added to the emulsion, which converts the water soluble soap into a water insoluble metallic soap that precipitates from the solution. The organic peroxide is entrained within the precipitate.

9 Claims, No Drawings

SUPPORTED PEROXIDES

FIELD OF INVENTION

The present invention relates to supported peroxides and a method of forming supported peroxides.

BACKGROUND OF THE INVENTION

Peroxides are used in polymer chemistry for a variety of purposes including, for example, reducing the molecular weight of polymers and vulcanizing rubber. One of the problems associated with the use of peroxides is that in their pure form, peroxides tend to be relatively unstable. Peroxides can break down and lose their activity while in storage. Furthermore, the decomposition and instability of peroxides can present storage and use hazards. For these reasons, peroxides are often diluted with at least one other substance, which improves the stability of the peroxide and facilitates handling. Peroxides that have been diluted with another substance are commonly referred to as "supported peroxides" in the industry.

One known method of forming a supported peroxide product is to melt and spray one or more peroxides onto an inorganic support such as clay or calcium carbonate. The molten peroxide becomes absorbed or adsorbed on the inorganic support and solidifies. The resulting supported peroxide product will be a powder that is easier to handle and is less hazardous than a "pure" peroxide product. One of the drawbacks of inorganic supported grade peroxide products is that the peroxide concentration is generally limited to about 40% by weight, which is the maximum that can be absorbed or adsorbed onto the inorganic support.

Another known method of forming a supported peroxide product is to mill one or more peroxides into a rubber composition to form a master batch product. Master batch products of this type are typically sold as slabs or pellets, which are also easily handled and are substantially less hazardous than pure peroxides. Once again, however, the peroxide concentration for rubber supported grade peroxide products is generally limited to a maximum of about 40% by weight.

Yet another known method of forming a supported peroxide product is to blend one or more peroxides into a molten wax, which is then permitted to cool and solidify. The solidified wax can be granulated or pelletized. It is possible to form supported peroxide products in this manner than have peroxide concentrations of 40% to 70% by weight. One of the drawbacks with wax supported grade peroxide products is that the peroxide must be processed at a high enough temperature to melt the wax, typically above 100° C., which can cause the peroxides to decompose and create a hazardous processing environment. It is also difficult to incorporate other ingredients, such as co-agents and anti-scorch agents, into such compositions.

A need exists for a supported peroxide product that contains a relatively high concentration of peroxide, that can be easily handled, and that can be manufactured at relatively low temperatures.

SUMMARY OF INVENTION

The present invention provides supported peroxides, and a method of forming supported peroxides. Supported peroxides according to the invention are solid particles that comprise an organic peroxide and a metallic soap. In accordance with the method of the invention, supported peroxides are preferably formed by dispersing a mixture comprising at least one peroxide and at least one $C_4$ to $C_{30}$ carboxylic acid into an aqueous solution containing a basic compound that is capable of reacting with the $C_4$ to $C_{30}$ carboxylic acid to form a water soluble soap. Dispersing the mixture into the aqueous solution results in the formation of an emulsion. A polyvalent metal compound that is capable of reacting with the water soluble soap to form a water insoluble metallic soap is then added to the emulsion, which converts the water soluble soap into a water insoluble metallic soap that precipitates from the solution. The organic peroxide is entrained within the precipitate.

Supported peroxide products in accordance with the invention can comprise as much as 90% or more by weight of organic peroxide. Notwithstanding the relatively high concentration of organic peroxide, supported peroxides according to the invention are more heat resistant under typical storage conditions than inorganic supported grades of lower concentration. Supported peroxides according to the invention are in the form of easy-to-disperse powders like inorganic supported grades, but readily melt in polymers like wax-based supported grades. The metallic soap adds lubricity to polymer melts and thus can function as a processing aid. Supported peroxides according to the invention are formed at lower temperatures, and thus are not prone to thermal decomposition during manufacturing.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Supported peroxide compositions according to the present invention comprise solid particles comprising an organic peroxide and at least one metallic soap. Without being held to a particular theory, applicants believe that each of the solid particles comprises a core consisting essentially of the organic peroxide and a coating layer disposed on the core that comprises the metallic soap. Scanning electron micrographs of the particles show that the coating layer is not continuous, meaning that portions of the organic peroxide core are left exposed. Rather than forming a continuous coating, the metallic soap appears to form discrete "platelets" that adhere to and form a mottled cladding over a substantial portion of the surface of the organic core.

Virtually any organic peroxide can be used in the invention. Preferably, however, the organic peroxide will be a solid at standard temperatures and pressures (25° C., 1 ATM) that has a melting point less than about 95° C., and more preferably less than about 50° C. Particularly suitable organic peroxides for use in the invention include, for example, dicumyl peroxide, a, a'-bis(tert-butylperoxy)-diisopropylbenzene, and benzoyl peroxide. It will be appreciated that combinations of two or more organic peroxides can also be used.

The metallic soap in the supported peroxide composition according to the invention comprises a salt of a polyvalent metal and at least one $C_4$ to $C_{30}$ carboxylic acid. Applicants have determined supported peroxide compositions comprising polyvalent salts of at least two different $C_4$ to $C_{30}$ carboxylic acids tend to exhibit superior handling properties (e.g., anti-clumping properties) than supported peroxide compositions comprising a polyvalent salt of only one $C_4$ to $C_{30}$ carboxylic acid. This improvement is noted even when only very small amounts of a "secondary" metallic soap are present in the composition.

The presently most preferred carboxylic acids for use in the invention are stearic acid and/or palmitic acid. These "primary" carboxylic acids are preferably used in combination with smaller amounts (e.g., about 0.01% to about 5.0% by weight) of "secondary" carboxylic acids selected from the group consisting of phthalic acid, terephthalic acid, maleic acid, fumaric acid, benzoic acid, and combinations thereof. Preferred polyvalent metals are calcium, magnesium, and aluminum, with calcium being the presently most preferred polyvalent metal. Preferred metallic soaps include, for example, calcium stearate, magnesium stearate, aluminum stearate, calcium palmitate, magnesium palmitate, aluminum palmitate, calcium phthalate, magnesium phthalate, aluminum phthalate, calcium terephthalate, magnesium terephthalate, aluminum terephthalate, calcium maleate, magnesium maleate, aluminum maleate, calcium fumarate, magnesium fumarate, aluminum fumarate, calcium benzoate, magnesium benzoate, and aluminum benzoate. It will be appreciated that combinations of two or more metallic soaps can also be used.

The supported peroxide composition according to the invention comprises solid particles. The particles tend to have a relatively narrow size distribution (i.e., all of the particles tend to be of substantially uniform size), with the average size of the particles being dependent upon the processing conditions (e.g., processing temperature, agitation, etc.). Typically, the particles with have an average particle size within the range of from about 100 to about 400 microns. Particles within this size range are easy to handle, and readily melt into and disperse in polymers.

The solid particles preferably comprise from about 10% to about 90% organic peroxide by weight. The solid particles can further comprise up to a total of about 50% by weight of one or more optional substances such as, for example, co-agents, anti-scorch agents, anti-oxidants, anti-ozonants, and UV light stabilizers. The balance of the particle comprises one or more metallic soaps. In a preferred embodiment of the invention, the solid particles comprise from about 40% by weight to about 85% by weight of dicumyl peroxide, from about 15% by weight to about 60% by weight calcium stearate, and from about 0.01% to about 5% by weight calcium phthalate.

In accordance with the method of forming supported peroxides according to the invention, a mixture comprising an organic peroxide and a $C_4$ to $C_{30}$ carboxylic acid is formed. Suitable organic peroxides for use in the invention have previously been discussed above. It will be appreciated that the $C_4$ to $C_{30}$ carboxylic acids can be any form of carboxylic acids including, but not limited to fatty acids, dicarboxylic acids, branched-chain, and substituted carboxylic acids. Suitable $C_4$ to $C_{30}$ carboxylic acids include, for example: saturated carboxylic acids such as butyric, caproic, caprylic, capric, lauric, myristic, palmitic, stearic, arachic, behenic, lignoceric, and cerotic acids; unsaturated carboxylic acids such as butenoic, methacrylic, octenoic, caproleic, undecylenic, myristoleic, palmitoleic, oleic, erucic, linoleic, linolenic, arachodonic, and docosahexenoic acids; aromatic carboxylic acids such as benzoic and toluic acids; and dicarboxylic acids such as malonic, maleic, fumaric, succinic, adipic, phthalic, terephthalic, isophthalic, and itaconic acids. It will be appreciated that combinations of two or more $C_4$ to $C_{30}$ carboxylic acids can be used. The mixture of organic peroxide and $C_4$ to $C_{30}$ carboxylic acid(s) is preferably heated to a temperature that is slightly above the melting point of the organic peroxide to facilitate good mixing and the formation of a uniform homogeneous mixture.

The heated mixture of organic peroxide and $C_4$ to $C_{30}$ carboxylic acid is dispersed in an aqueous solution that comprises a compound that is capable of reacting with the $C_4$ to $C_{30}$ carboxylic acid to form a water soluble soap. The compound that is capable of reacting with the $C_4$ to $C_{30}$ carboxylic acid to form a water soluble soap will preferably comprise a water soluble base such as sodium hydroxide, potassium hydroxide, or ammonium hydroxide. In a preferred embodiment of the invention, the aqueous solution further comprises the "secondary" $C_4$ to $C_{30}$ carboxylic acid.

Preferably, the heated mixture is added to the aqueous solution under constant stirring to promote the formation of an emulsion. To facilitate the formation of an emulsion, it is preferable for the aqueous solution to also be heated to a temperature slightly above the melting point of the organic peroxide. The aqueous solution will preferably only comprise the minimum amount of the compound that is capable of reacting with the $C_4$ to $C_{30}$ carboxylic acid to form a water soluble soap necessary to neutralize all of the $C_4$ to $C_{30}$ carboxylic acids (i.e., primary and secondary) in the emulsion. If the ratio of base to total equivalents of $C_4$ to $C_{30}$ carboxylic acids is less than about 1, incomplete emulsification ("creaming") will likely occur. If the ratio of base to total equivalents of $C_4$ to $C_{30}$ carboxylic acids is greater than about 1.5, significant amounts of base will remain in the aqueous solution, which can present waste treatment problems. Accordingly, the preferred ratio of base to total equivalents of $C_4$ to $C_{30}$ carboxylic acids is from about 1.0 to about 1.2.

After the heated mixture has been dispersed in the aqueous solution, the emulsion is preferably cooled to a temperature below the melting point of the organic peroxide. Without being bound to a particular theory, applicants believe that the organic peroxide becomes trapped within the emulsion micelles. The water soluble soap coats at least a portion of the organic peroxide at the interface with the aqueous solution. As the emulsion cools to a temperature below the melting point of the organic peroxide, the organic peroxide solidifies (and perhaps crystallizes) within the emulsion micelles.

After the emulsion has cooled to a temperature below the melting point of the organic peroxide, a polyvalent metal salt that is capable of reacting with a water soluble soap to form a water insoluble metallic soap is added. Preferred polyvalent metal cations that can be used for this purpose include: alkaline-earth metals such as beryllium, magnesium, calcium, strontium, and barium; transition metals such as titanium, vanadium, chromium, manganese, iron, cobalt, nickel, copper, zinc, zirconium, molybdenum, palladium, cadmium, and mercury; and other metals such as aluminum, gallium, tin, lead, and lanthanoid metals. Calcium salts are preferred, with calcium chloride and/or calcium sulfate being presently most preferred. Combinations of two or more polyvalent metal compounds can be used, if desired.

Addition of the polyvalent metal compound causes the water soluble soap to convert to a water insoluble metallic soap, which precipitates from the aqueous solution. As used throughout the specification and in the appended claims, the term "water insoluble" means that the metallic soap has a solubility in water at 25° C. of less than about 2.0%.

As noted above, without being held to a particular theory, applicants believe that each of the solid particles comprises a core consisting essentially of the organic peroxide and a coating layer disposed on the core that comprises the metallic soap. Scanning electron micrographs of the particles show that the coating layer is not continuous, meaning that portions of the organic peroxide core are left exposed. Rather than forming a continuous coating, the metallic soap appears to form discrete "platelets" that adhere to and form a mottled cladding over a substantial portion of the surface of the organic core. The precipitate can be separated from the aqueous solution by vacuum filtration or other conventional separation means. The resulting powder can, but need not, be washed and dried.

Supported peroxide products in accordance with the invention can comprise as much as 90% or more by weight of organic peroxide. Notwithstanding the relatively high concentration of organic peroxide, supported peroxides according to the invention are more resistant to clumping under typical storage conditions than inorganic supported grades of lower concentration. Supported peroxides according to the invention are in the form of easily handled and easy-to-disperse powders like inorganic supported grades, but readily melt in polymers like wax-based supported grades. The metallic soap adds lubricity to polymer melts and thus can function as a processing aid. Supported peroxides according to the invention are formed at lower temperatures, and thus are not prone to thermal decomposition during formation.

The following examples are intended only to illustrate the invention and should not be construed as imposing any limitations upon the claims.

EXAMPLE 1

Supported Peroxide 1 was formed by mixing 5.0 grams of a, a'-bis(tert-butylperoxy)-diisopropylbenzene (available from GEO Specialty Chemicals of Cleveland, Ohio under the trade designation VUL-CUP® R) and 1.2 grams of stearic acid together in a 4 ounce glass bottle. The mixture was heated in a water bath to 45° C. and mixed until a homogeneous liquid phase was obtained.

In a separate 400 mL beaker, 0.43 grams of solid sodium hydroxide (pellets) and 0.50 grams of phthalic acid were added to 100 mL of deionized water. The solution was heated on a hot plate to 45° C. and mixed until all solids were completely dissolved.

The heated peroxide/stearic acid mixture was added into the heated aqueous solution under constant stirring. Stirring was continued for about 5 minutes until a uniform emulsion was formed. The emulsion was then allowed to cool to a temperature of less than about 30° C. The emulsion had a milky appearance.

After the emulsion had cooled to a temperature of less than about 30° C., 1.03 grams of solid calcium sulfate (dihydrate) was added to the emulsion under constant stirring. The calcium sulfate (dihydrate) caused the emulsion to break down and form a precipitate. After approximately 10 minutes, the precipitate was recovered from the solution by vacuum filtration. The precipitate was then dried.

The precipitate consisted of about 75% by weight a, a'-bis(tert-butylperoxy)-diisopropylbenzene, about 24.8% calcium stearate, and about 0.2% calcium phthalate. The precipitate comprised a solid powder comprising a narrow distribution of particles having an average particle size of about 200 microns. Analysis of scanning electron micrographs taken of the particles suggest that the particles comprise a core consisting essentially of a, a'-bis(tert-butylperoxy)-diisopropylbenzene coated with a scaly coating comprising calcium stearate and calcium phthalate.

EXAMPLE 2

EPDM rubber compositions A, B, and C were formulated in accordance with conventional methods using the amounts of the components shown in Table 1 below:

TABLE 1

| Component | A | B | C |
| --- | --- | --- | --- |
| KELTAN ® 512X50 | 100 phr | 100 phr | 100 phr |
| HAF Black N330 | 50 phr | 50 phr | 50 phr |
| KADOX ® 911 | 5.0 phr | 5.0 phr | 5.0 phr |
| AGERITE ® Resin D | 1.0 phr | 1.0 phr | 1.0 phr |
| VUL-CUP ® 40KE | 4.0 phr | — | — |
| VUL-CUP ® 40C | — | 4.0 phr | — |
| Supported Peroxide 1 | — | — | 2.13 phr |

KELTAN® 512x50 is an ethylene propylene diene monomer (EPDM) synthetic rubber available from DSM Elastomers of Addis, La. HAF Black N330 is a carbon black product available from Shinwoo Advanced Materials Co., Ltd. of Seoul, Korea. KADOX® 911 is a zinc oxide product available from Zinc Corporation of America of Monaco, Pa. AGERITE® Resin D is an anti-oxidant resin available from R. T. Vanderbilt Company, Inc. of Norwalk, Conn. VUL-CUP® 40KE and VUL-CUP® 40C are supported peroxide products available from GEO Specialty Chemicals of Cleveland, Ohio. VUL-CUP® 40KE comprises about 40% by weight of a, a'-bis(tert-butylperoxy)-diisopropylbenzene dispersed on Burgess KE clay. VUL-CUP® 40C comprises about 40% by weight of a, a'-bis(tert-butylperoxy)-diisopropylbenzene dispersed on calcium carbonate. Supported Peroxide 1 is the product formed in Example 1 above.

EPDM rubber compositions A, B, and C were subjected to oscillating disc rheometry (360° F., 3° Arc, 100 cpm, 24 minute motor), and the physical properties of vulcanized EPDM rubber compositions A, B, and C were tested for various physical properties, the results of which are reported in Table 2 below:

TABLE 2

| Parameter Measured | A | B | C |
| --- | --- | --- | --- |
| Oscillating Disc Rheometry | | | |
| Minimum Torque (in-lbs) | 13.75 | 13.16 | 14.02 |
| Maximum Torque (in-lbs) | 44.39 | 44.43 | 45.40 |
| Delta Torque (in-lbs) | 30.65 | 31.26 | 31.38 |
| Ts2 (minutes) | 1.33 | 1.25 | 1.25 |
| T90 (minutes) | 7.18 | 7.02 | 6.60 |
| Physical Properties of Vulcanized Rubber Compound | | | |
| Modulus at 100% Elongation (psi) | 170 | 160 | 160 |
| Modulus at 200% Elongation (psi) | 380 | 340 | 360 |
| Modulus at 300% Elongation (psi) | 780 | 720 | 790 |
| Tensile Strength (psi) | 2510 | 2620 | 2650 |
| Elongation at Break (%) | 600 | 630 | 590 |
| Shore A Hardness | 56 | 56 | 56 |

The results shown in Table 2 above demonstrate that lesser amounts, by weight, of a supported peroxide composition according to the invention are sufficient to provide equivalent vulcanization results as conventional supported peroxides.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A supported peroxide composition comprising solid particles having a core comprising an organic peroxide and a mottled cladding disposed on the core, the mottled cladding comprising a combination of a primary metallic soap and a secondary metallic soap, the primary metallic soap comprising a polyvalent metal salt of a $C_4$ to $C_{30}$ carboxylic acid and the secondary metallic soap comprising a polyvalent metal salt of a carboxylic acid selected from the group consisting of phthalic acid, terphthalic acid, maleic acid, fumaric acid, benzoic acid and combinations thereof.

2. The supported peroxide composition according to claim 1 wherein the solid particles comprise a core consisting essentially of the organic peroxide.

3. The supported peroxide composition according to claim 1 wherein the organic peroxide is selected from the group consisting of dicumyl peroxide, a, a'-bis(tert-butylperoxy)-diisopropylbenzene, benzoyl peroxide, and combinations of two or more thereof.

4. The supported peroxide composition according to claim 1 wherein the solid particles comprise from about 10% by weight to about 90% organic peroxide by weight.

5. The supported peroxide composition according to claim 1 wherein the primary metallic soap is selected from the group consisting of calcium stearate, magnesium stearate, aluminum stearate, calcium palmitate, magnesium palmitate, aluminum palmitate, and combinations of two or more thereof.

6. The supported peroxide composition according to claim 1 wherein the solid particles have an average diameter of from about 100 to about 400 micrometers.

7. The supported peroxide composition according to claim 1 wherein the solid particles further comprise up to a total of about 50% by weight of optional substances selected from the group consisting of co-agents, anti-scorch agents, anti-oxidants, anti-ozonants, UV light stabilizers, and combinations of two or more thereof.

8. The supported peroxide composition according to claim 1 wherein the solid particles comprise from about 40% by weight to about 85% by weight of dicumyl peroxide, from about 15% by weight to about 60% by weight calcium stearate, and from about 0.01% to about 5% by weight calcium phthalate.

9. The supported peroxide composition according to claim 1 wherein the secondary metallic soap is selected from the group consisting of calcium phthalate, magnesium phthalate, aluminum phthalate, calcium terephthalate, magnesium terephthalate, aluminum terephthalate, calcium maleate, magnesium maleate, aluminum maleate, calcium fumarate, magnesium fumarate, aluminum fumarate, calcium benzoate, magnesium benzoate, and aluminum benzoate, and combinations of two or more thereof.

* * * * *